May 7, 1968

A. C. ANWAY ETAL 3,381,570

FULL ROTATION MEASURING OPTICAL INSTRUMENT PROVIDING
PRECISE ANGULAR READOUT

Filed Oct. 30, 1963

INVENTORS
ALAN C. ANWAY
JOHN E. DAWKINS
ROBERT D. JOY

BY

ATTORNEYS

May 7, 1968     A. C. ANWAY ETAL     3,381,570
FULL ROTATION MEASURING OPTICAL INSTRUMENT PROVIDING
PRECISE ANGULAR READOUT

Filed Oct. 30, 1963     5 Sheets-Sheet 3

INVENTORS
ALAN C. ANWAY
JOHN E. DAWKINS
ROBERT D. JOY

BY *Moody and Kintzinger*
ATTORNEYS

United States Patent Office 3,381,570
Patented May 7, 1968

3,381,570
FULL ROTATION MEASURING OPTICAL INSTRUMENT PROVIDING PRECISE ANGULAR READOUT
Alan C. Anway and John E. Dawkins, Cedar Rapids, and Robert D. Joy, Marion, Iowa, assignors to Collins Radio Company, Cedar Rapids, Iowa, a corporation of Iowa
Filed Oct. 30, 1963, Ser. No. 320,118
7 Claims. (Cl. 88—14)

ABSTRACT OF THE DISCLOSURE

A full rotation measuring optical instrument using some optical autocollimator principles and providing the same order of accuracy of rotational position measurement throughout complete revolutions of the article being measured. Two side-by-side multisurface optical polygon reflectors are used, one fixed to a frame of reference and the other connected to the device (or shaft) being rotation position measured. A rotatably mounted autocollimator type optic lens system is used with additional mirrors for transmitting two light beams falling one on each of the polygon reflectors simultaneously and back again through the mirror and optic lens system with displacement between the two reflected images at a readout surface being proportional to the angular difference between the fixed and movable polygon reflectors, and generally, while the optic lens system is rotating at a rate much faster than the device, or shaft, being measured.

Figure 1:
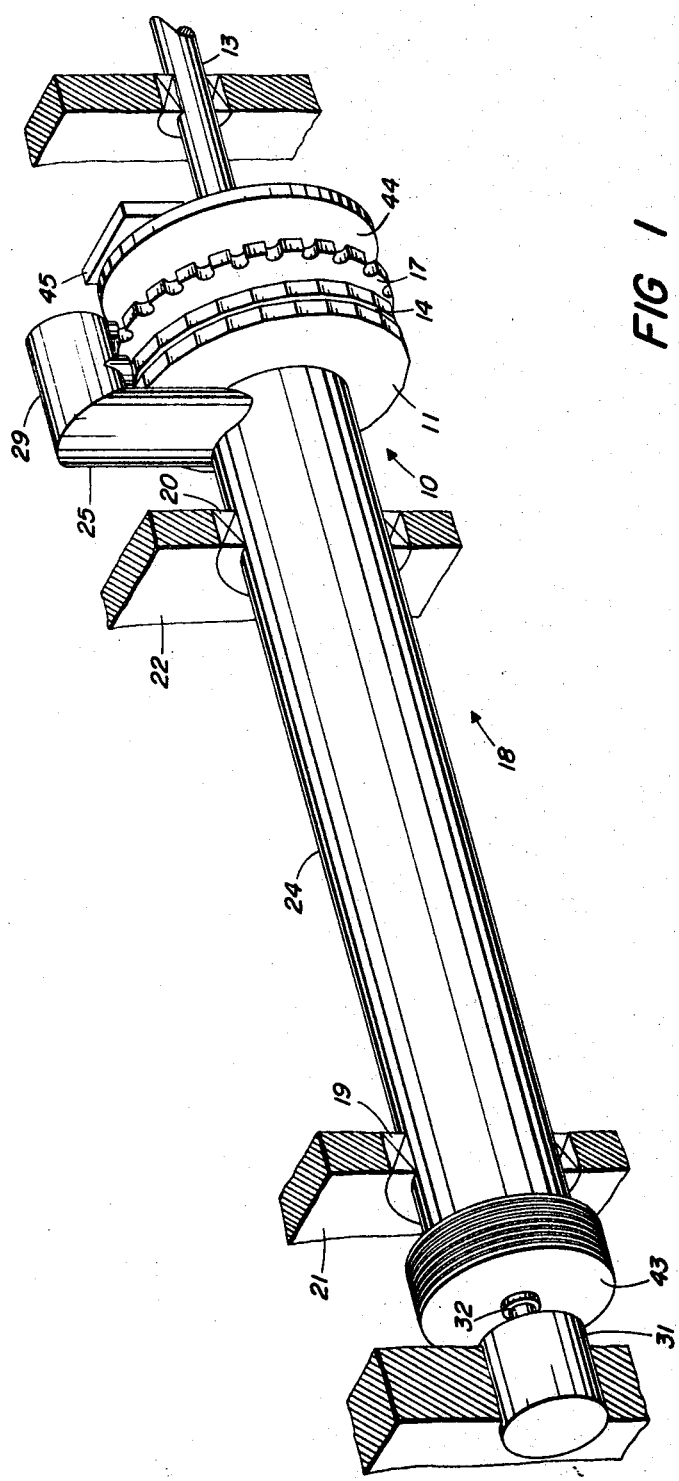

This invention relates to accurate measurement of shaft angular positions, and more particularly to a very accurate system, including optics, using image reflection displacement for measuring angular shaft position throughout complete revolutions of the shaft.

There are a number of devices that have been employed for precision positioning and precise angular readout wth rotatable antenna mounts, radio telescopes, optical telescopes, inspection and navigation instruments and machine tools. Various devices used for attaining such measurements include multipole resolvers giving space averaged positions; and photoelectric or brush encoders with no averaging of position output readings. While multipole resolvers give highly accurate results, they give an analog output and the system is relatively complex. Furthermore, photoelectric, and brush encoding systems are limited in accuracy, falling, generally, considerably short of the accuracy obtainable with multipole resolvers or optical autocollimators. However, a severe limitation with autocollimators, heretofore, is that it has not been possible to measure angular rotation, with only one setting of the equipment, through more than a small fraction of a degree of rotation.

It is, therefore, a principal object of this invention to provide a rotational position measuring system providing the same order of accuracy as an optical autocollimator, and to extend this order of accuracy of rotational position measurement throughout complete revolutions of devices being position measured.

A further object is to provide for the averaging of errors in reflected image measurements in such a rotational position indicating device.

Features in the accomplishment of these objects include the providsion of two multisurface optical polygon reflectors, one of which is fixed to a frame of reference and the other connected to be rotationally driven with the shaft being rotation positioned measured. An autocollimator type optic lens system is used along with additional mirrors for transmitting a hair-line thin ray of light, or hair-line image, to fall on both polygons simultaneously and transmission of the reflections back through the mirror and optic lens system as two reflected images. The displacement between the two reflected images at the readout surface is proportional to the angular difference between the fixed and movable polygon reflectors. The readout surface may be at an optic readout plane or, as shown in a disclosed embodiment, a linear array of photodetectors. With a sufficient number of reflecting surfaces on both the fixed and rotatable polygons and the movable shaft rotated to, or a little less than, the autocollimator range for one set of reflecting surfaces, the next reflecting surface of the rotatable polygon comes into view in the optic system. With further rotation of the shaft, the reflected image moves across the field of view and as it reaches the end of the measurable range it is in turn replaced by the image reflection from the next reflective surface of the rotatable polygon. Counting the number of image changes with rotation of the shaft, plus the optic system reading of displacement for one set of reflecting surfaces determines the amount of rotation according to the formula $$X = \frac{360N}{P} + A$$

with X the total angular movement in degrees, N the number of image changes, P the number of reflecting surfaces on the polygon, and A the optic surface reading in degrees for the reflected images in view at the moment of measurement. This sort of measurement may be accomplished with the lens system motionless if some loss of accuracy may be tolerated. However, any errors in various movable polygon reflector surfaces will contribute directly to measurement errors.

Further features of this invention in minimizing such measurement errors include rotation of the combination optic lens and mirror viewing system about both the fixed and movable polygon reflectors at a rate much faster than the rate of rotational displacement of the shaft being position measured. With this construction, and sufficient speed of rotation, the reflected images falling upon the linear array of photo-detectors appear to move across the field of view as the lens and mirror system is rotated, but the displacement between the two images being read will remain nearly constant for any one rotated position of the rotatable polygon and the shaft being position measured. Substantially any relative motion of image reflections due to errors in reflecting polygon surfaces will substantially average out to zero through each complete revolution of the lens and mirror system. With this improved position measuring system, the rough position of the shaft being position measured is given by a resolver or encoder. such as provided by the output from a disc encoder and brush assembly, in place of counting the number of image changes, and this is combined with the output of the photodetectors in providing a meaningful average corrected position indicating readout. Obviously, the output of the photodetectors must be transmitted through a system of slip rings of conventional structure and a driving system must be provided for rotating the lens and mirror system. Furthermore, an appropriate light source and light collimating system is provided for obtaining a suitable hair-line thin sheet ray of light projected through the system to both the fixed and movable polygon reflectors and for transmission of the image reflections from the two polygon reflectors back through the mirror and lens system to viewing means or viewing photodetectors. Light source triggering means is also provided for timing light source turn on and turn off consistent with rotation of the lens and mirror system.

Specific embodiments representing what are presently regarded as the best modes of carrying out the invention are illustrated in the accompanying drawings.

Figure 2:
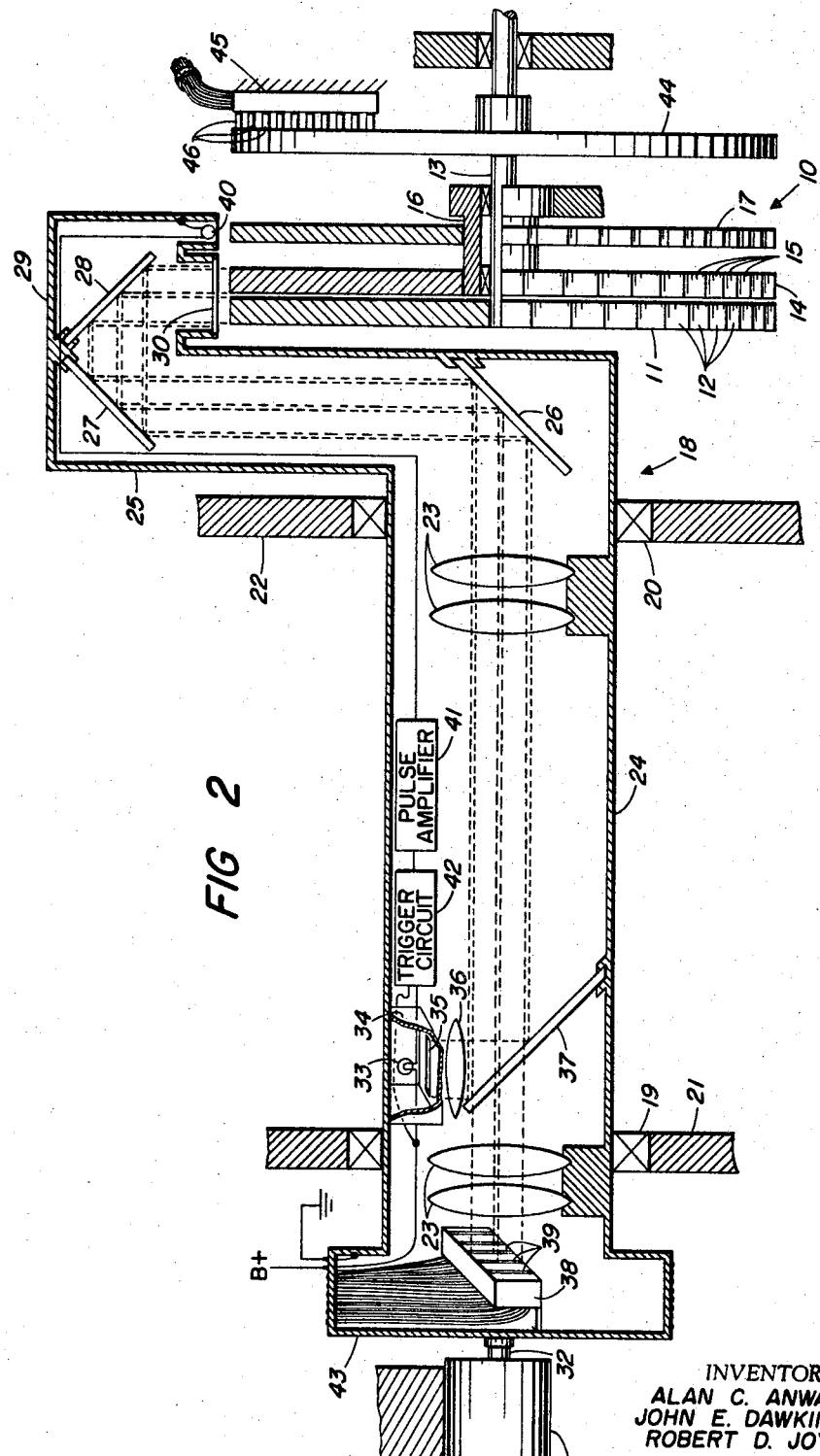
Figure 3:
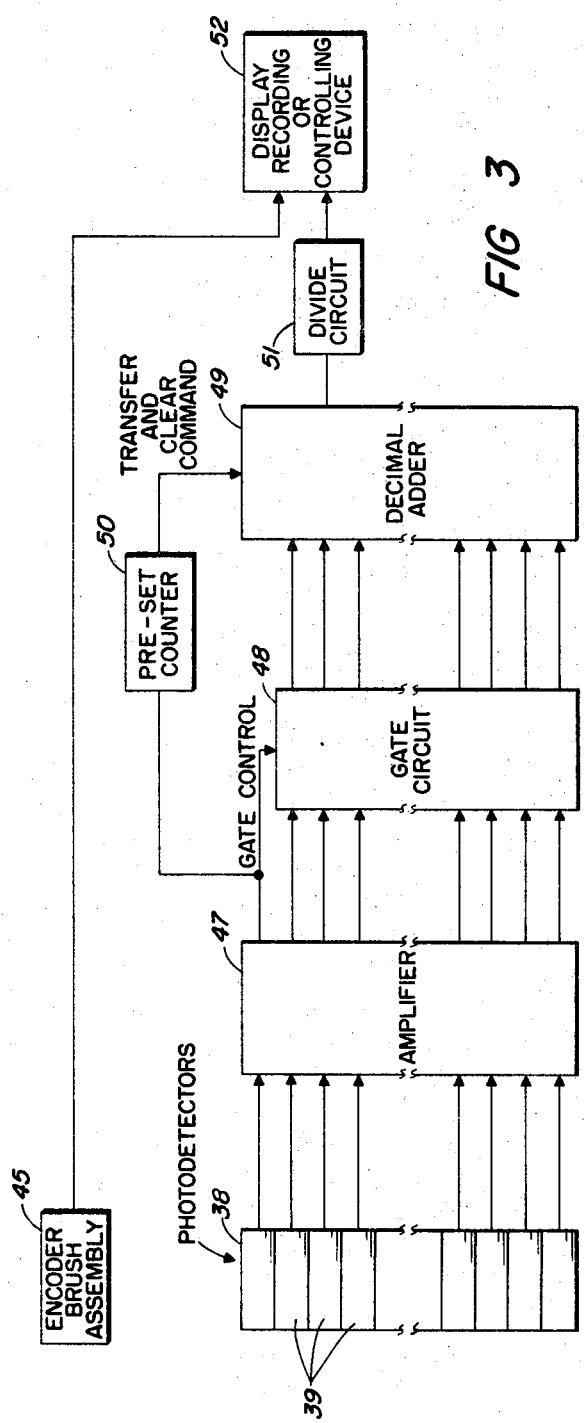
Figure 4:
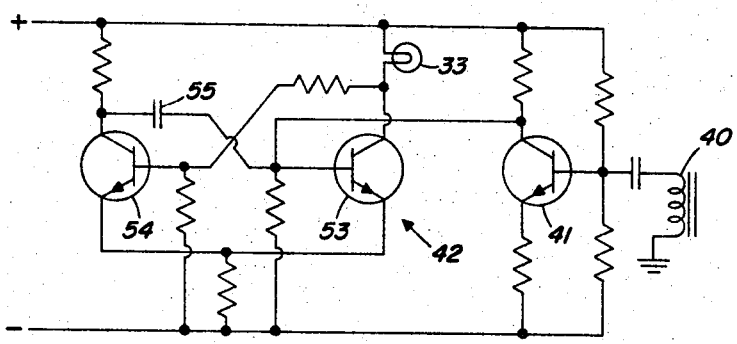
Figure 5:
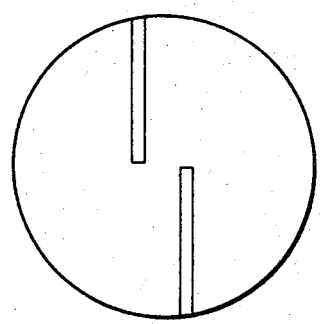
Figure 6:
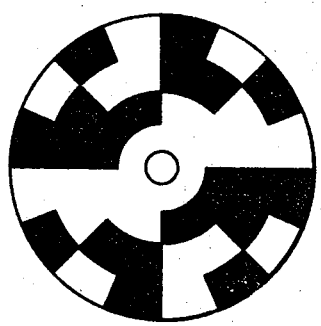
Figure 8:
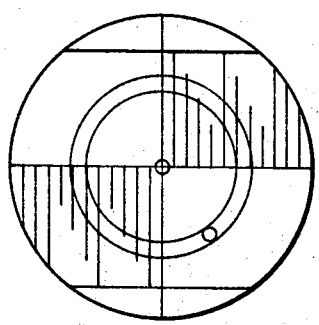
Figure 7:
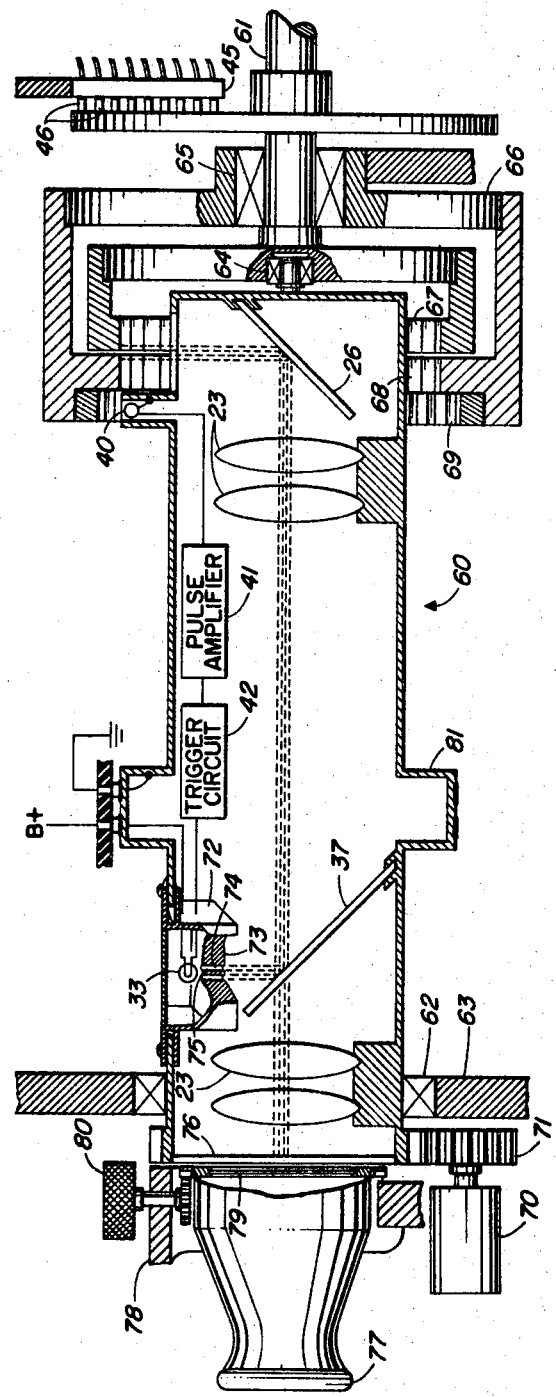

In the drawings:

FIGURE 1 represents a perspective view of a dual fixed and rotatable reflective polygon, rotatable optical viewing rotated position measuring device;

FIGURE 2, a partially cutaway and partial schematic view of the device;

FIGURE 3, a block diagram of associated computing and readout or utilizing circuitry;

FIGURE 4, a schematic diagram of the collimating light source triggering control circuit;

FIGURE 5, a view of the reflected light ray images as would be seen by the eye at the linear array of image sensing photodetectors;

FIGURE 6, a disc encoder such as may be used with an encoder brush assembly for rough rotation position determination;

FIGURE 7, a partially cutaway and partial schematic view of another full rotation measuring optical instrument embodiment; and FIGURE 8, a view of reflected light dot images and the concentric circular paths traced by the dot images.

Referring to the drawings:

The full rotation measuring optical instrument 10 of FIGURES 1 and 2 is shown to include a polygon disc 11 with multiple reflecting surfaces 12 mounted for rotation with the rotatable shaft 13 being rotation measured. A second nonrotational polygon disc 14, having multiple reflecting surfaces 15, is positionally fixed on a sleeve extension 16 of fixed frame mounting structure (detail not shown). A multiple magnetic pole disc 17 is also positionally fixed on the frame sleeve extension 16. An optic viewing structure 18 is rotatably mounted by bearings 19 and 20 in additional mounting frame portions 21 and 22 to extend along, and for rotation substantially about, the extended axis of rotational shaft 13.

The optic viewing structure 18 is equipped with a multiple lens 23 main body containing portion 24. A radial extension 25 from body 24 is used with a system of angled mirrors 26, 27 and an additional angled mirror 28 in a viewing projection 29 of extension 25. Viewing projection 29 is equipped with a viewing window 30 opposite the outer periphery of polygon discs 11 and 14. Motor 31 has an output shaft 32 connected for rotating main body portion 24 and the optic viewing structure 18.

FIGURE 2 also shows the optic structure 18 to include a trigger controlled light source 33 contained within a light tight box 34 except for a bottom longitudinally extended narrow slit 35 for emission of a hair-line thin ray of light to and through a light collimating lens 36 to a half-silvered angled mirror 37. The reflection of the hair-line thin sheet ray of light is passed from the half-silvered angled mirror 37 through forward lens 23 and then by way of mirrors 26, 27 and 28 outward to the respective reflecting surfaces of polygon discs 11 and 14. The respective images reflected by reflective surfaces of both polygon discs 11 and 14 are returned by angled mirrors 28, 27 and 26, through forward lens 23, the half-silvered mirror 37, and through rearward lens 23 to a viewing surface. This viewing surface comprises, in the embodiment of FIGURE 2, a linear array 38 of photodetectors 39 with the array disposed generally along an axis substantially perpendicular to the longitudinal axes of the reflected hair-line thin ray images received at the linear array of photodetectors, and perpendicular to the axis of rotation of the optic viewing structure 18.

A magnetic field cutting coil 40 is provided within viewing projection 29 in close proximity to the periphery of multiple magnetic pole disc 17 for obtaining electrical impulses with rotation of the optic viewing structure 18 as the coil 40 is moved around disc 17. These electrical pulses are passed through pulse amplifier 41 to trigger circuit 42 for timing the light 33 and controlling the duration of each pulse of light. Voltage and voltage potential reference connections are provided through slip ring 43 for the trigger control circuitry of light 33. Slip ring 43 also provides for connection of leads from the photodetectors 39, of the photodetector linear array 38, to external circuitry.

An encoder disc 44, which may be of the type illustrated in FIGURE 6, is also fixed on shaft 13 for rotational measurement with the shaft. An encoder brush assembly 45 is mounted on a fixed portion of the frame (detail not shown) for riding engagement of multiple brushes 46 with the patterned conductive-nonconductive surface face of disc 44 in a conventional fashion. This is employed with normal ambiguity type resolving circuitry in the brush encoder decoding circuitry to eliminate requirements for precise alignment of the encoder with optical readout.

Referring now to FIGURE 3, the output leads of the linear array 38 of photodetectors 39 are connected through slip ring 43 (not indicated in FIGURE 3) as multiple inputs to amplifier 47. Each pulse of light 33 as controlled by the trigger circuit is sufficiently long to insure that the reflected image from the fixed polygon disc 14 will fall upon the first photodetector 39 of the photodetector array 38. The reflected image from the movable polygon disc 11 is displaced from the reflected image of the fixed polygon disc 14 by an amount very accurately indicative of the rotational position of shaft 13, as indicated by reflected image spacing in FIGURE 5.

The output of the first photodetector is connected through amplifier 47 as a gate control to gate circuit 48 for allowing the decimal adder 49 to accept the amplified output of the photodetector array as energized by the reflected image from the movable polygon disc 11. The adder 49 stores a number determined by the particular photodetector of the array energized by the reflected image from the movable polygon disc 11. For example, if a particular photodetector 39 were energized, then the number of that photodetector is stored and the two polygon reflected images are rotationally displaced one from the other by that number of units. As each polygon surface is passed by the viewing projection 29 of the rotating optic viewing structure 18 the action described is repeated and each new number is added in the decimal adder 49 to the position indicating numbers previously obtained. With one or more complete revolutions of the rotating optic viewing structure 18, as predetermined by a control setting on preset counter 50, also connected for actuation through amplifier 47 by the first photodetector 39, repeated respective totals stored in the decimal adder 49 are transferred successively to divide circuit 51. Divide circuit 51 operates to provide by division, with the same value used in the preset counter 50, a divided output applied through connective circuitry to display, recording, or utilizing device 52. This technique of measurement averaging, or difference in position determination, of two reflected images not only reduces any errors contributed by individual optic polygon surfaces, but also reduces the quantizing errors arising from the use of a finite number of photodetectors.

The output of the brush encoder assembly 45 is also applied as an input to the display, recording, or utilizing device 52 as a rough rotation and ambiguity type resolving circuit for the readout, or utilizing device 52. This provides, to a very high degree of accuracy, a measure of the total angular rotational difference between shaft 13 and a fixed frame of reference. It should be noted that maximum error ($\epsilon$ in radians) allowable for each revolution of the optic viewing structure 18 with an optics rotation rate N radians per second, and with input shaft 13 movement of R radians per second is $$\epsilon = \frac{R}{N}$$

This is with a period of optics rotation equal to $1/N$ seconds, and shaft 13 moving $$R \times \frac{1}{N} \text{ radians}$$

Referring again to multiple magnetic pole disc 17, this disc has a number of slots around its edge between poles equal to the number of surfaces on each of the polygons 11 and 14. The magnetic field cutting coil 40 senses each slot when, as it passes the slots with rotation of the optic viewing structure 18, the electrical pulses generated by this magnetic field cutting action of coil 40 are passed to the amplifier and trigger control circuit as shown in detail in FIGURE 4, for trigger pulsing and timing light 33. The pulse amplifier 41 is a transistor amplifier with associated biasing circuitry and input and output connections. The trigger circuit 42 is shown to include the first and second transistors 53 and 54 with appropriate biasing, interconnecting, input, and light 33 output circuitry. During periods of operation transistor 54 is normally conducting and transistor 53 is turned off. However, when a pulse is generated, and amplified by transistor 41, transistor 53 is turned on simultaneously turning transistor 54 off. Then, to insure light pulses of sufficient duration, transistor 53 continues to conduct with light 33 remaining on until capacitor 55 is discharged.

It should be noted that if the optic viewing system of the embodiment of FIGURE 2 is utilized in the non-rotated state, light source 33 must be connected to burn continuously. Coil 40 and disc 17 do not function and only one reflective surface would be required in place of the multi-reflective surfaces of disc 14. Viewed in this manner, the displacement between the two reflected images at the readout surface, as shown in FIGURE 5, is proportioned to the angular difference between the position of the movable polygon reflector disc and a fixed reference. For example, using the formula $$X = \frac{360N}{P} + A$$

with X the total angular movement in degrees, N the number of image changes, P the number of reflecting surfaces on the polygon disc, and A the optic surface reading in degrees for the reflected images in view at the moment of measurement; with P equal to 720, N equal to 42, with 42 image shifts in rotational movement from an initial reference position, and with a quantitative reading or output indication of 0.2541 from the optics system, $$X = \frac{360 \times 42}{720} + 0.2541 = 22.2541 \text{ degrees}$$

In the embodiment of FIGURE 7, the rotating optics structure 60 longitudinally extends along the extended axis of the rotatable shaft 61, being position measured, and is mounted for rotation about this extended axis by bearing 62 mounted in frame portion 63 and bearing 64 mounted in the end of shaft 61. Shaft 61 is in turn mounted by bearing 65 in frame member 66. In this embodiment, components the same as corresponding components in the other embodiment, for convenience, will be numbered the same.

Both the rotating multireflecting surface polygon 67, mounted on the end of shaft 61, and the multireflecting surface fixed polygon 68, mounted on frame member 66, have their reflecting surfaces facing radially inwardly toward, and/or concentric with, the observing end of the optical structure 60. The multipole serrated element 69, replacing disc 17, also faces radially inwardly for cooperative pulse creating action in coil 40 during rotation of the optical structure 60 as driven by motor 70 through gear train 71.

In this embodiment, light source 33 is contained within a box 72 which has a thickened bottom 73 with two small, relatively long openings 74 and 75, to result in two relatively small diameter dot beams of light being projected down toward the half-silvered mirror 37. These beams of light are projected through forward lens 23 and from mirror 26 one each to reflective surfaces of the respective polygons and back to mirror 26, through forward lens 23 to and through the half-silvered mirror 37 and through rear lens 23 to the viewing surface pane 76. Pane 76 may be of a translucent nature and include short-life light retaining material so that movement of a light beam across the viewing surface pane 76 will leave a short-life retained image of the path of motion of the light beam. With this construction and mirror 26 properly located relative to the polygons 67 and 68, and box 72 containing light 33 properly adjustably positioned, the light beam reflected from fixed polygon 68 could result in a center point image, or at most a small diameter circle, at viewing surface pane 76 while the other light beam would inscribe a relatively larger diameter circle concentrically about the center beam image. With rotation of the input shaft in one direction the circle would change in diameter in one direction, and with rotation of the shaft in the opposite direction the diameter of the circle would change in the opposite direction. This growth or shrinkage of the circle would be consistent with the rate of rotational movement of shaft 61 and would occur by steps, each step occurring when the motion would be sufficient to bring the next surface of the reflective surfaces on the movable polygon 67 into reflected image viewing position by the optical structure 60.

The adjusted relation of the center beam and the other beam inscribing a concentric circle on the viewing surface pane 76 is shown in FIGURE 8. An eyepiece 77 may be provided for ease of viewing, mounted in frame portion 78 and may include a scale screen 79 adjacent the viewing surface pane 76 with markings as indicated in FIGURE 8. Screen 79 may be radially adjustably positioned by adjustment thumb wheel 80. Obviously a battery field of photodetectors could be substituted for eyepiece 77 and the scale of screen 79 in providing a suitable readout from this device. Furthermore, the readout system and two beam light system of the embodiment of FIGURE 7 could replace the corresponding portions in the embodiment of FIGURE 2 and thereby eliminate the multitudinous slip ring requirements of the embodiment of FIGURE 2 with slip ring requirements being limited only to voltage and voltage potential reference contacts through slip ring 81.

Whereas this invention is here illustrated and described with respect to several specific embodiments thereof, it should be realized that various changes may be made without departing from the essential contributions to the art made by the teachings hereof.

We claim:

1. In an optical apparatus for measuring the rotation of a rotating member mounted for rotation about an established axis of rotation; a first faceted multireflecting surface polygon fixed to said rotating member and in concentric relation to said axis of rotation; a second similarly faceted multireflecting surface polygon fixed to a frame of reference and in concentric relation to said axis of rotation; an optic lens and mirror structure including a light beam passing window portion positioned to pass light beams to both said first and second multireflecting surface polygons and to pass light beams reflected back from the multireflecting surfaces of said polygons, a timed light source, light collimating means positioned to form light emitted by said light source into collimated light, and readout means including beam impinging means substantially normal to an extension of the established axis of rotation and giving a sensed indication of the relative rotative positions between said first and second multireflecting surface polygons; with said optic lens and mirror structure rotatable substantially about an extension of the established axis of rotation of said rotating member, and with a substantial portion of the optic lens and mirror structure positioned substantially on the extension of said established axis of rotation and extended along a substantial portion of said axis of rotation extension; means for rotating said optic lens and mirror structure means in said optic lens and mirror structure position for translating light from said light source and passed by said light collimating means to directional light beams substantially parallel to said axis of rotation extension and substantially along a portion of said axis of rotation extension; and with said optic lens and mirror structure including a mirror section constructed with mirror positioning to translate said directional light beams parallel to and along said axis of rotation extension to project through said window portion to, and for reflection back of light beam images from said first and second multireflection surface polygons; and with said mirror positioning of said mirror section further being such as to translate said light beam images in the form of reverse directional light beams back through a portion of said optic lens and mirror structure to the beam impinging means of said readout means.

2. The apparatus of claim 1 wherein, said readout means includes a translucent pane of material substantially normal to said established axis of rotation, and an eyepiece; and with said readout means being means for measuring displacement between reflected images including a position measuring scale screen adjustably positionable mounted relative to said translucent pane of material.

3. The apparatus of claim 1 wherein, light source triggering and timing means controls turn on and turn off of said light source consistent with rotation of the lens and mirror structure, and includes, a multiple magnetic pole member fixed to a frame of reference; a magnetic field cutting coil positioned for rotation with said lens and mirror structure in close proximity to the multiple poles of said multiple magnetic pole member for obtaining electrical impulses from said coil during rotation of the lens and mirror structure relative of the multiple magnetic pole member and the frame of reference.

4. The apparatus of claim 1 wherein, said readout means includes a linear array of side-by-side photodetectors facing a plane of view normal to the longitudinal axes of rotation of said lens and mirror structure.

5. The apparatus of claim 4 wherein, rough rotation position ambiguity resolving means is connected to the rotating member being rotation measured; said photodetectors are connected to external readout circuitry; and rough rotation ambiguity type resolving circuitry connects said rough rotation position ambiguity resolving means to said external readout circuitry.

6. The apparatus of claim 5 wherein, said rough rotation position ambiguity resolving means comprises an encoder disc and brush assembly; and wherein said external readout circuitry includes amplifying means, a decimal adder, and dividing circuitry plus a final readout utilizing device.

7. The apparatus of claim 1 wherein, said first and second polgons have their reflecting surfaces facing radially inwardly and each reflecting surface is substantially normal to a radial passing substantially through the center of each respective reflecting surface and through said established axis of rotation, and said first and second polygons are substantially concentric with said established axis of rotation of the optical structure.

References Cited
UNITED STATES PATENTS

| | | |
|---|---|---|
| 2,586,540 | 2/1952 | Holden. |
| 2,730,698 | 1/1956 | Daniels et al. |
| 2,894,389 | 7/1959 | Brownhill et al. _____ 73—136 |
| 3,278,927 | 10/1966 | Vlasenko et al. |

JEWELL H. PEDERSEN, *Primary Examiner.*

A. A. KASHINSKI, *Assistant Examiner.*